United States Patent Office 3,291,524
Patented Dec. 13, 1966

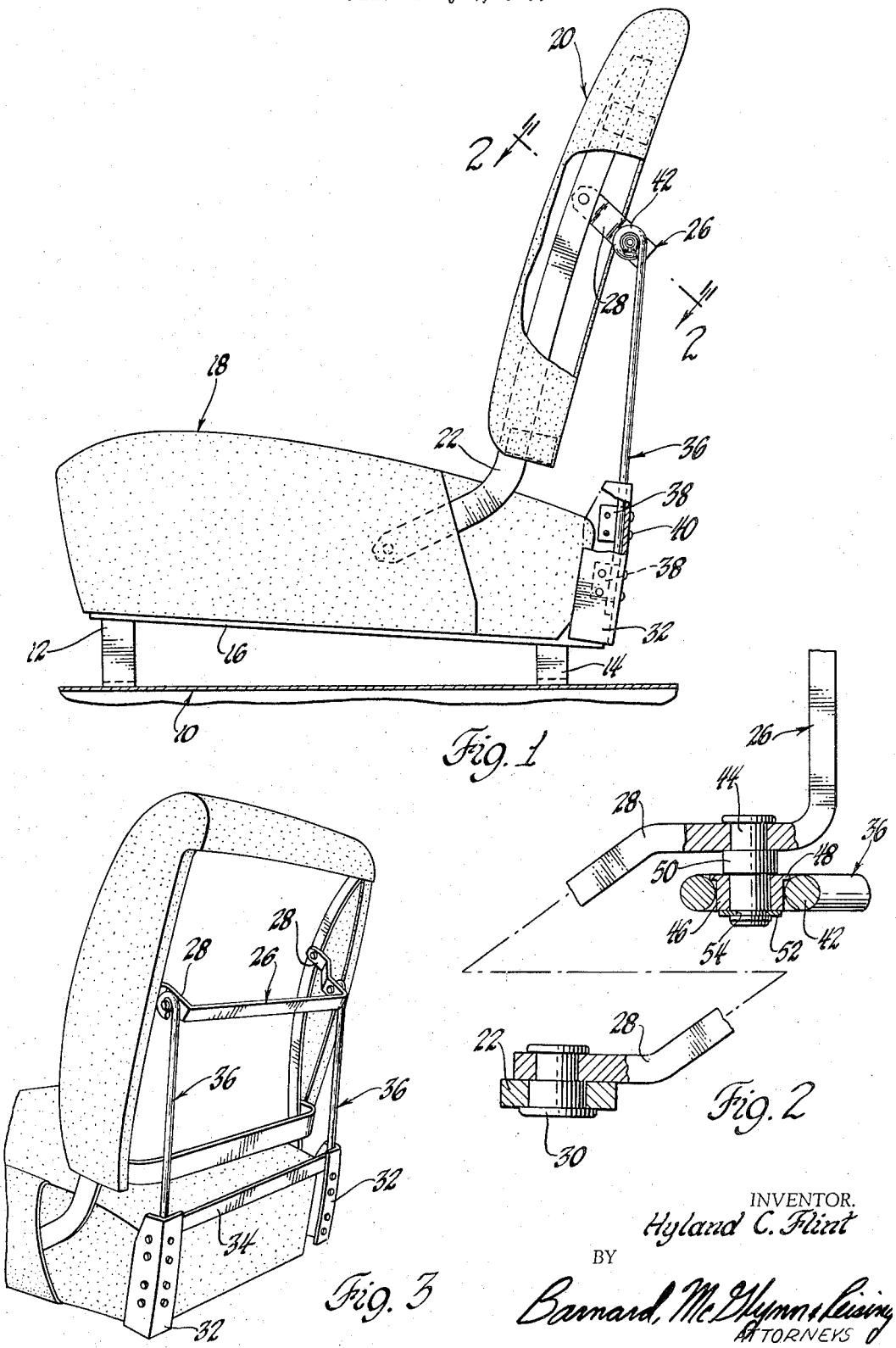

3,291,524
BACKREST SUPPORT MEANS
Hyland C. Flint, 3551 Walnut Lake Road, Rte. 2,
Orchard Lake, Mich.
Filed July 6, 1965, Ser. No. 469,516
3 Claims. (Cl. 297—302)

This invention relates to unison action seating, and more particularly to backrest support means for a unison action seat structure.

Unison action seating may be generally described as a seating structure in which the backrest assembly is so connected to the seat cushion assembly that the seat back moves downwardly with deflection of the seat cushion. It is often desirable that the backrest move downwardly in such a day as to maintain its angularity relative to the base frame. In other words, the backrest moves in a substantially vertical line with deflection of the seat cushion.

In United States Patents Nos. 2,602,487 and 2,925,120, in the name of Hyland C. Flint, unison action seat structure of the type typically used in trucks, or the like, are shown and described. Such seat structures include a yoke member extending across the back of the backrest assembly which is pivotally mounted to the backrest frame. The yoke is also pivotally mounted to rigid supporting uprights, extending upwardly from the base frame. The side frame members of the backrest are secured to the seat cushion springs in such manner as to move upwardly and downwardly with deflection of the seat springs, the yoke member in its pivotal movement about the uprights maintaining substantially vertical movement of the backrest assembly without substantial change in angularity of the backrest assembly relative to the base frame.

In the design and development of vehicles, there is an increasing demand for lessening the available space in the seating compartments, particularly in truck cabs. This means that the thickness of a backrest must be considerably reduced to allow sufficient space for the driver between the steering wheel and the backrest of the seat structure. With the unison action type of seating illustrated and described in the above-mentioned patents, the decreasing space allowance requires considerable change in the backrest support structure. As long as considerable space is available, the distance between the front and rear pivots on the rocker yoke is sufficient to permit the yoke legs to arc downwardly about the upright pivot supports from a proper position above the horizontal to a position below the horizontal. However, with such decreasing space and a consequent reduction in the distance between the pivots, it is readily apparent that with a severe jolt or the like the rocker arm might lock in its downward position. The rigidity of the upright supports from the base would prevent return of the backrest with upward movement of the seat cushion.

In certain situations, and particularly where truck cabs are mounted over the front wheels of the vehicle, there is considerable horizontal pitch to the top of the backrest due to the pivot arc about the front wheel bearings. The rigid mounting heretofore provided in such seating structures provides no relief for such pitch, resulting in a tendency of the backrest to "slap" the back of the occupant with such motion.

The construction in which this invention is embodied comprises, generally, a seat and backrest structure similar to those set forth in the above-cited patents, and further including a shortened yoke member extending between the sides of the backrest frame and pivotally connected thereto. Extending upwardly from the base frame of the seat construction are a pair of resilient wire spring members, pivotally attached to the legs of the yoke member rearwardly of their pivotal attachment to the backrest frame. Such spring wire members are horizontally yieldable, thus permitting a considerable reduction in length of the legs of the yoke member to allow for lessened distance or space available in the truck cab. Such resilient spring members also avoid the "lockdown" problem, since their resilience permits the return of the backrest structure and the yoke member with the return of the deflected springs in the seat cushion. Additionally, such resilience in the supporting means for the rocker yoke reduces the stresses and strains on the springs in the backrest structure, increasing the life of such springs and avoiding early breakage.

These and other advantages will become more apparent from the following description and drawings in which:

FIGURE 1 is a side elevational view, with parts broken away and in section, of a unison action seat structure embodying the invention and illustrating the position of the various parts;

FIGURE 2 is a partial cross-sectional view of a portion of the structure illustrated in FIGURE 1, taken substantially along the lines 2—2 of FIGURE 1 and looking in the direction of the arrows to illustrate the pivotal connections at the rocker yoke; and FIGURE 3 is a perspective view of the rear of a seat structure such as illustrated in FIGURE 1, illustrating the position of the various parts.

Referring more particularly to the drawing, the figures illustrate a unison action seat structure of the general type illustrated in U.S. Patent Nos. 2,602,487 and 2,925,120, in the name of Hyland C. Flint. Such a unison action seat structure may be employed in a vehicle, such as a truck or the like, having a supporting floor, illustrated generally by the numeral 10, from which extend supporting members 12 and 14 to support a seat base structure 16. It is to be understood at the outset that the structure herein described is not restricted to truck seating or motor vehicle seating, but to any seating structure of the unison action type. Truck seating is referred to because it best illustrates the severity of the various conditions to which unison action seating of this type may be subjected.

Mounted on the base frame 16 is a seat cushion, illustrated generally by the numeral 18, which may be of any suitable type and may employ springs and other upholstery material to provide a comfortable seating cushion. Mounted above the seat cushion 18 is a backrest structure, illustrated generally by the numeral 20, the backrest structure including side frame members 22 which extend downwardly and forwardly to a pivot connection 24, such connection being made to the seat springs in the cushion 18 in a manner similar to that set forth in the aforementioned United States patents. The pivot connection 24 is made to the springs at the "A" point of the seat cushion; that is, the point receiving the concentrated seating load, and are movable upwardly and downwardly with such springs as the seat is deflected by the user and deflected under jolts and bounces. Backrest 20 includes suitable springs and other upholstery support for the comfort of the user.

Extending between the side frame members 22 of the backrest portion 20 is a U-shaped yoke member, illustrated generally by the numeral 26. Yoke member 26 includes forwardly directed legs 28 which are pivotally secured by pivot pins 30 in the side frame members 22. Legs 28 may be bent as illustrated in FIGURES 1 through 3 for best positioning relative to the backrest 20.

Extending upwardly from the base frame 16 and at the rearward corners thereof, are channel members 32, which may be connected at their upper ends by a suitable strap or the like 34 for strengthening purposes. Secured in each of the channel members 32 is a spring wire member, illustrated generally by the numeral 36, extending upwardly from the channels 32 to the yoke member 26. Suitable retaining means, such as corner brackets 38, suitably secured to the channel 32 as by rivets 40, secure the wire spring members 36 in the channels 32.

The upper ends of wire members 36 are formed in loops 42 to permit securement to the legs 28 of the yoke member 26. Pivot pins 44 are secured in the legs 28 in any suitable manner, and a bushing 46 is press-fitted into the loop 42 in each of the wire members 36. Bushings 46 include enlarged flanges 48, the corners of which contact the wire loop 42, as best illustrated in FIGURE 2. Bushing 46 is maintained in place against a shoulder 50, formed on the pivot pin 44, by means of a retaining ring 52, suitably received in an annular groove 54 formed in the pivot pin 44. Thus, the legs 28 of the yoke member 26 are pivotally secured to the backrest 20 through the pivots 30 and pivotally secured to the upstanding wire members 36 by the pivot means 44.

In the operation of the seat construction, as the seat cushion 18 is deflected under the load of a user or through jolts and bounces as the structure in which the seat is mounted encounters obstructions, the backrest 20 moves downwardly or upwardly with the seat springs in the cushion 18 due to the frame connection 24. In so doing, the legs 28 of the rocker member 26 pivot about the pivots 44 through a short arc to substantially maintain the angularity of the back 20 with the base frame 16. The spring wire members 36 deflect horizontally to a limited extent to permit such movement. Under severe jolt or bounce, the legs 28 move downwardly a greater distance and are prevented from locking down by the resilience or horizontal movement of the wire members 36. The resilience of the wires 36 provides a soft feel to the backrest structure that is not objectionable to the user of the seat.

Side-sway or lateral movement of the backrest 20 is prevented by the bushings 46 press-fitted in the loop 42 of the spring wire members 36 and the engagement of the flanges 48 within the loops 42. As long as the bearings are properly dimensioned and properly aligned, the yoke member 26 becomes, in effect, a radius rod, preventing the bearings from being forced out of alignment with each other, thus preventing any sideward displacement of the seat back 20 relative to the seat 18.

Thus, a backrest support structure is provided which is resilient in nature, and allows for decrease in the length of the yoke arms consistent with available space in the truck cab or the like within which the seat structure is used. Such resilient support also eliminates any "backslap" caused by horizontal pitch of the top of the backrest due to movement of the vehicle. At the same time, the resilience of the support members eliminates stress problems in the backrest springs. The overall result is a more comfortable seating structure, a safer seating structure, and one that has a longer life and less breakage problems.

Various modifications and alterations will occur to those having skill in the art after having had reference to the foregoing description and drawings. However, it is not intended to limit the scope of the invention by the foregoing description and drawings but by the scope of the appended claims in which:

The embodiments of the invention in which an exclusive property or privilege is claimed are defined as follows:

1. Backrest support means for a unison action seat construction having a base and a seat movable relative to said base and a backrest having side frame members secured to and movable with said seat, said support means comprising:

a yoke member extending between said side frame members and having legs pivotally secured to said side frame members;

flexible support members secured to said base and extending upwardly therefrom;

and pivot means secured in the upward ends of said support members and secured in said yoke member rearwardly of said side frame members to permit pivotal movement of said yoke member relative to said support members for maintaining the angular relationship of said backrest relative to said base when said backrest moves with said seat member.

2. The backrest support means set forth in claim 1 wherein said pivot means includes a pivot shaft secured at one end in said yoke member, and a bushing on said pivot shaft and press-fitted in said support members.

3. The backrest support means set forth in claim 2 wherein said pivot shafts and said bushings in said side frame members are disposed on the same axis to prevent side-sway of said backrest relative to said base.

References Cited by the Examiner

UNITED STATES PATENTS

| | | | |
|---|---|---|---|
| 1,929,023 | 10/1933 | Hickman | 297—302 |
| 2,163,751 | 6/1939 | Flint | 297—301 |
| 2,591,144 | 4/1952 | Fleischer | 297—302 |
| 2,726,831 | 12/1955 | Bleck et al. | 297—302 X |
| 2,925,120 | 2/1960 | Flint | 297—302 |
| 3,140,118 | 7/1964 | Dorn | 297—302 X |

FRANK B. SHERRY, *Primary Examiner.*

G. O. FINCH, *Assistant Examiner.*